United States Patent [19]

Mason et al.

[11] Patent Number: 5,396,058
[45] Date of Patent: Mar. 7, 1995

[54] ROBUST METHOD FOR DETERMINING AN IMAGING SYSTEM FOCUS ERROR

[75] Inventors: Kenneth L. Mason, Santa Barbara, Calif.; Philip F. Marino, Rochester, N.Y.

[73] Assignee: Eastman Kodak Company, Rochester, N.Y.

[21] Appl. No.: 74,900

[22] Filed: Jun. 10, 1993

[51] Int. Cl.$^6$ .............................................. G01J 1/20
[52] U.S. Cl. ................... 250/201.7; 354/407
[58] Field of Search ............... 250/201.7, 201.2, 201.3, 250/561; 354/406, 407, 408; 356/4

[56] References Cited

U.S. PATENT DOCUMENTS

| | | | |
|---|---|---|---|
| 4,341,953 | 7/1982 | Sakai et al. | 250/201.7 |
| 4,460,989 | 7/1984 | Russell | 250/201.7 |
| 4,540,881 | 9/1985 | Hayashi et al. | 354/406 |
| 4,621,191 | 11/1986 | Suzuki et al. | 354/406 |
| 4,633,075 | 12/1986 | Sakai et al. | 250/201.7 |
| 5,166,506 | 11/1992 | Fiete et al. | 250/201.7 |

Primary Examiner—David C. Nelms
Assistant Examiner—Steven L. Nichols
Attorney, Agent, or Firm—Thomas H. Close

[57] ABSTRACT

A robust method for determining a radiation imaging system focus error, that employs a focus sensor and an accompanying curve determined analytically or empirically according to the characteristics of the sensor, is disclosed. In a preferred embodiment, the focus sensor comprises two beamsplitters, a spacer, and three detectors comprising CCD array. The three detectors are constrained to satisfy radiation path length specifications, with respect to the beamsplitters and spacer. In the method, the curve representing variance vs. focus position is empirically determined. The focus sensor may then be aligned in an unused portion of an imaging system radiation field. The detectors simultaneously image the same scene, sampling it at three different focus positions. These sampled points are then fit to the empirically determined curve; a maximum of the fitted curve is a robust measure of the imaging system focus error.

24 Claims, 7 Drawing Sheets

ROBUST METHOD FOR DETERMINING AN IMAGING SYSTEM FOCUS ERROR

FIELD OF THE INVENTION

This invention relates to a robust method for determining an imaging system focus error.

BACKGROUND OF THE INVENTION

A canonical imaging system that may be used to explain the concept of an imaging system focus error, is shown in FIG. 1.

The FIG. 1A imaging system 10 comprises a conventional lens 12. Radiation rays 14, which represent parallel incident radiation beams from a fixed and infinite object point 16, are reflected by the lens 12 and converge to a focus F at a focal point 18. The focal point 18 is a sub-set of a focal plane 20 which intersects the focal point 18.

By definition, the focal point 18 is the image of the fixed and infinite object point 16. Accordingly, if a radiation detector 22, for example (and where appropriate), a photographic film, is placed coincident with the focal plane 20, the image of the fixed object point 16 at an imaging plane 24 defined by the radiation detector 22, can be sharply developed by the radiation detector 22.

In summary, the FIG. 1A imaging system 10 has been so constructed (i.e., with the focal plane 20 coincident with the imaging plane 24) that it does not introduce focus error: it is in-focus. An indicia of this desired condition is that the fixed and infinite object point 16 can be sharply developed, i.e., without undue blurs, fuzziness or other degradations of the image.

Attention is now directed to FIG. 1B, which shows a first modification of the FIG. 1A imaging system 10, so that a first out-of-focus condition can be demonstrated. Here, the imaging plane 24 has been physically displaced, by a distance D, from the focal plane 20. The physical displacement D corresponds to an introduction of focus error, and thus introduces a "sensible" and undesirable degradation of the image quality of the object point 16.

Attention is now directed to FIG. 1C, which shows a second modification of the FIG. 1A imaging system 10, so that a second out-of-focus condition can be demonstrated. Here, the focal plane 20 is still coincident with the imaging plane 24, but the heretofore fixed and infinite object point 16 has been displaced so that it is now located at a finite distance from the imaging system 10. This relocation action induces an out-of-focus condition, D, thereby introducing a sensible and undesirable image degradation.

Note, although not shown in FIG. 1, that an out-of-focus condition can also be induced by inter alia: changes in the lens 12 curvature, or temperature gradients incurred by the imaging system 10. In all cases, it is desired to determine a focus error for an out-of-focus condition, so that the imaging system can be efficiently restored to the in-focus state, thus providing sharp images of an object.

U.S. Pat. No. 5,166,506 issued in the name of Fiete et al. discloses a method for determining an imaging system focus error. That method employs a focus sensor and accompanying reference curve. However, that method samples three different focus positions to use as a basis for generating a parabolic curve, whereby the maximum of the parabolic curve is a measure of the imaging system focus error. Utilizing a parabolic curve provides reasonable results for small focus errors. However, either as focus error increases, or as the system response changes due to effects such as component aging or varying conditions of use or environment, the parabolic curve proves to be an inadequate representation of the true focus error from the point of optimum focus. As such, the parabolic curve does not accurately represent the full range of sensor response to various focus positions.

PROBLEM TO BE SOLVED BY THE INVENTION

A need has therefore been felt for a robust method for determining an imaging system focus error, whereby the reference curve used as a measure of the system focus error represents the range of sensor response to various focus positions more accurately, particularly under varying conditions of use, than does a parabolic curve generated from three sampled points.

SUMMARY OF THE INVENTION

The concept and the problem of focus, as defined above, are known, at least in a theoretical way. The necessity for its satisfactory solution remains, however, especially, and in particular, when the following constraints may be superimposed on a solution:

1. a determination of focus error is to be done in real time;
2. a determination of focus error is to be done automatically;
3. a determination of focus error is to be done non-iteratively; and/or
4. a determination of focus error is to be done with great quantitative precision.

The present invention is an improved method for determining an imaging system focus error. Important advantages of the method are that its use addresses and accommodates the problem of focus error, so that one is enable to satisfy the above-listed constraints, namely:

1) the determination of focus error can be done in real time, so that one can look at moving objects;
2) the determination of focus error can be done automatically, i.e., without human intervention;
3) the determination of focus error can be done non-iteratively; and
4) the determination of focus error can be done with great quantitative precision, for example, a determination of focus error D within thousandths of an inch; and, for an exceptionally broad and dynamic range of object distances, essentially, infinite.

ADVANTAGEOUS EFFECTS OF THE INVENTION

One advantage of the present invention is that the generated reference curve more accurately represents the functional character and physical condition of the sensor at any given time.

Another advantage of the present invention is that the generated reference curve is not restricted to a specific mathematical function.

A further advantage of the present invention is that the capture range of focus error is dramatically extended, thereby enhancing the accuracy of the determined error.

A further advantage of the present invention is that the generated reference curve can be iteratively updated during use, thereby accounting for changes in: the condition of the sensor (dirty lens, drift of operating electronics); use conditions (temperature, environment); and scene changes, from satellite for example (winter (snow-covered) vs. summer (trees)).

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

DESCRIPTION OF THE PREFERRED EMBODIMENTS

A sensor suitable for determining focus error in summarized above. Preferred and alternative embodiments of such a sensor are first disclosed, by way of FIGS. 2–4, followed by a recital of its operation in a first method for determining focus error, and then in the improved method of the present invention.

Figure 1A:
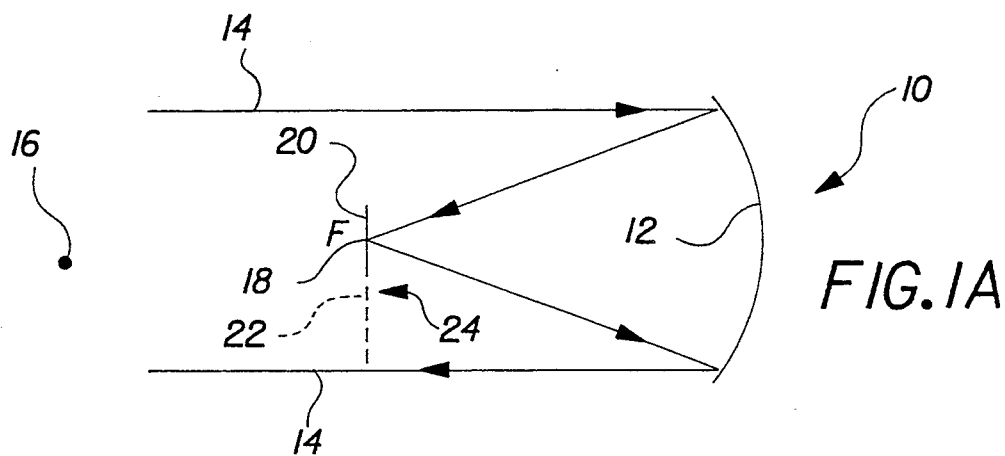
FIGS. 1A–1C show a canonical imaging system that is used to explain the concept of focus error.
Figure 1B:
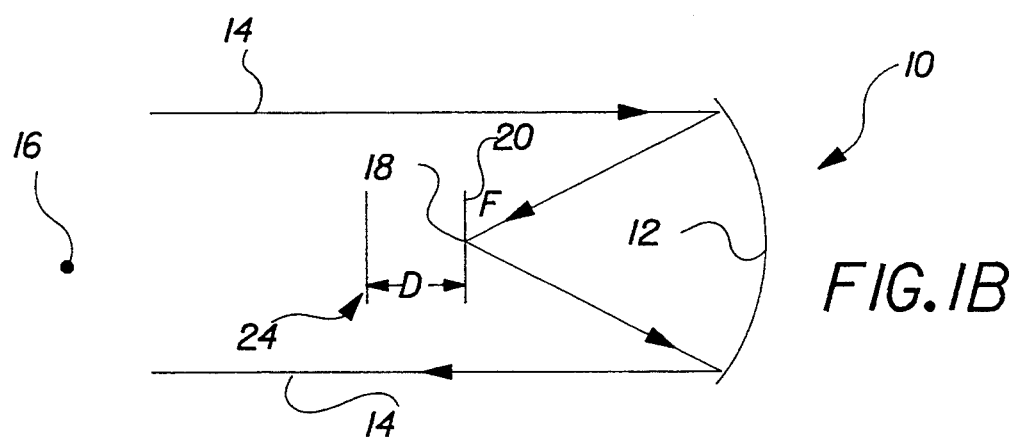
Figure 1C:
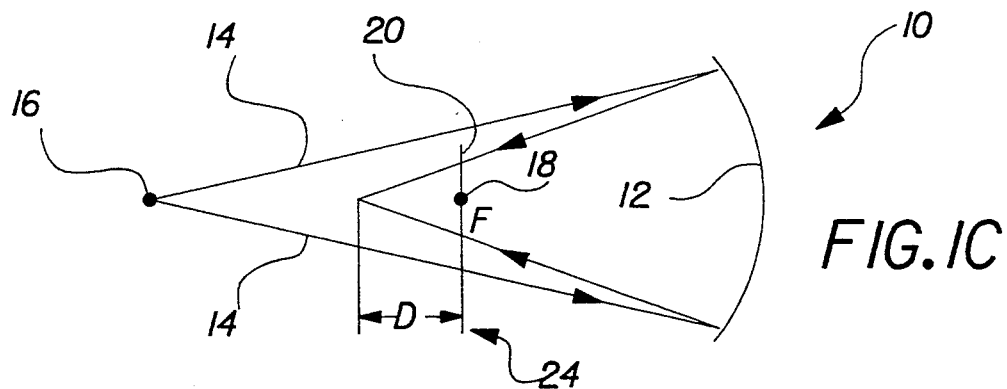
Figure 2:
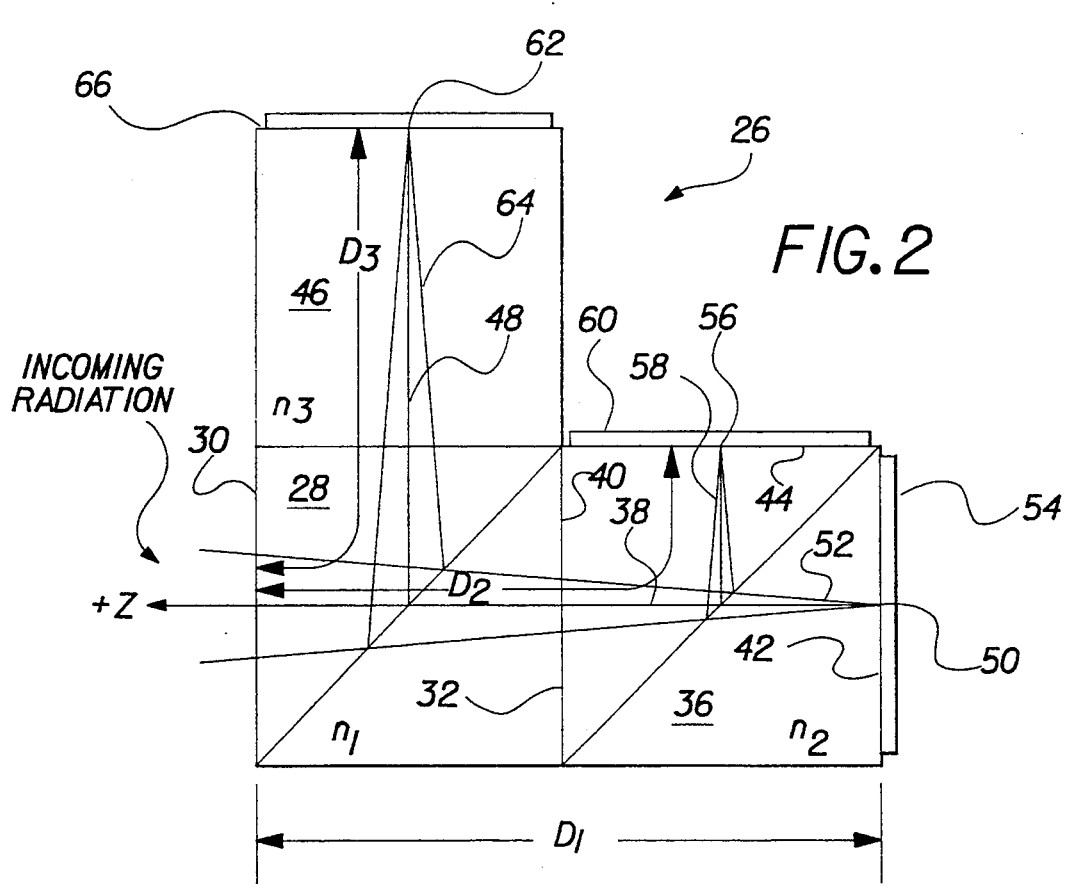
FIG. 2 shows a sensor of the present invention.

FIG. 2, accordingly, shows a preferred sensor 26 of the present invention. The FIG. 2 sensor 26 includes the following elements:

1) A first conventional beamsplitter 28 comprising an input scene radiation surface 30, and first and second output surfaces 32, 34. The first beamsplitter 28 preferably has an index of refraction $n_1$, $n_1 = 1.5$, and preferably has a reflection/transmission ratio 33%/67%.

2) A second conventional beamsplitter 36 locate in a transmission radiation path 38 generated by the first beamsplitter 28, and comprising an input radiation surface 40, and first and second output surfaces 42, 44. The second beam splitter 36 preferably has an index of refraction $n_2$, $n_2 = 1.5$, and preferably has a reflection/transmission ratio 50%/50%. The second beamsplitter 36 is preferably bonded to the first beamsplitter 28 by a conventional means, for example, a conventional adhesive or an optical cement.

3) A conventional spacer 46 having an index of refraction $n_3$, where preferably $n_3 = 1.5$, and comprising, for example, homogeneous glass or quartz or plastic. The spacer 46 is preferably physically positioned (e.g., glued) adjacent the output surface 34 of the first beamsplitter 28, and aligned along a reflection path 48 generated by the first beamsplitter 28.

The FIG. 2 sensor 26 also includes the following elements:

4) A first radiation detector preferably comprising a conventional CCD array 50. The CCD array 50 is located in a transmission radiation path 52 generated by the second beamsplitter 36. In particular, the CCD array 50 is preferably attached to the first output surface 42 by a conventional means, e.g., an adhesive. Note that the CCD array 50 defines an imaging plane 54, which imaging plane 54 intersects an "ideal focus" (i.e., conjugate to a system prime focus) formed by the converging transmission radiation path 52. Note furthermore that a known radiation path length $D^1$ can be measured from the input surface 30 of the first beamsplitter 28, to the first radiation detector comprising the CCD array 50.

5) A second radiation detector preferably comprising a conventional CCD array 56. The CCD array 56 is located in a reflection radiation path 58 generated by the second beamsplitter 36. In particular, the CCD array 56 is preferably attached to the second output surface 44 by a conventional means, e.g., a glue. Note that the CCD array 56 defined an imaging plane 60, which imaging plane 60 intersects an "ideal focus-0.035 inches" formed by the converging radiation path 58. Note further more that a known radiation path length $D_2$ ($D_2 \neq D_1$) can be measured from the input surface 30 of the first beamsplitter 28, to the second radiation detector comprising the CCD array 56.

6) A third radiation detector preferably comprising a conventional CCD array 62. The CCD array 62 is located in a reflection radiation path 64 generated by the first beamsplitter 28. In particular, the CCD array 62 is preferably attached by a conventional means to an edge of the spacer 46. Note that the CCD array 62 defines an imaging plane 66, which imaging plane 66, which imaging plane 66 intersects an "ideal focus +0.035 inches" formed by the converging radiation path 64. Note furthermore that a known radiation path length $D_3$ ($D_3 \neq D_2 D_1$) can be measured from the input surface 30 of the first beamsplitter 28, to the third radiation detector comprising the CCD array 62.

FIG. 2. in summary, shows a preferred sensor 26 of the present invention. The sensor 26 comprises two beamsplitters (28, 36), a spacer 46, and three radiation detectors comprising the CCD arrays (50, 56, 62). The sensor 26, moreover, defines three known radiation path lengths $D_1$, $D_2$, $D_3$ and requires that $D_1 \neq D_2 \neq D_3 \neq D_1$.

The FIG. 2 radiation path lengths $D_1$, $D_2$, $D_3$ can each be expressed in accordance with an equation (1):

$$\text{radiation path length} = \sum_{\substack{\text{each} \\ \text{element}}} (\text{index of refraction} \times \text{physical length}) \quad (1)$$

Figure 3:
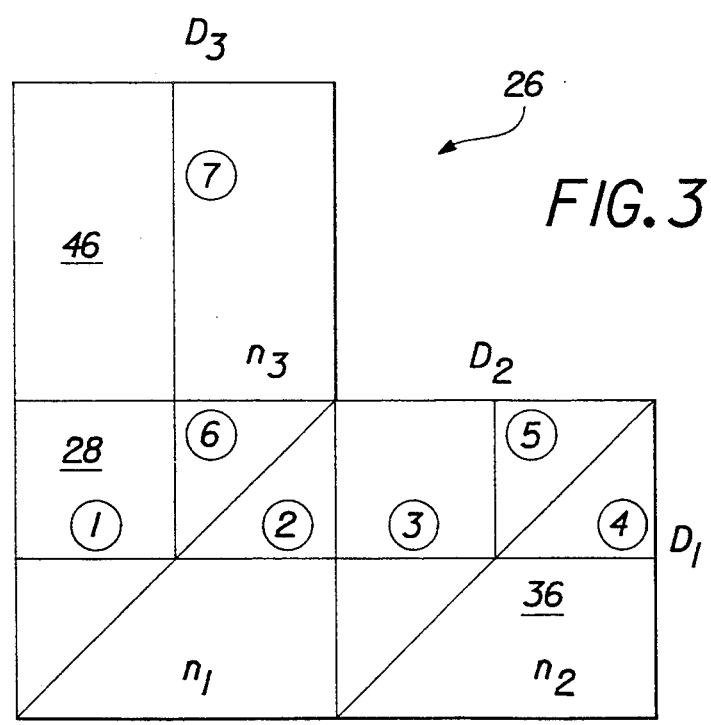
FIG. 3 is a redrawing of the FIG. 2 sensor, provided to isolate operational constraints.

Thus, as shown in FIG. 3, which summarizes the FIG. 2 path lengths, the radiation path lengths (RPL) for the sensor 26 can be developed as follows:

$$RPL_{D1} = n_1①+n_1②+n_2③+n_2④ \quad (2)$$

$$RPL_{D2} = n_1①=n_1②=n_2③=n_2⑤ \quad (3)$$

$$PRL_{D3} = n_1①=n_1⑥=n_3⑦ \quad (4)$$

where, $$PRL_{D1} \neq RPL_{D2} \neq RPL_{D3} \neq RPL_{D1} \quad (5)$$

and, $RPL_{D1}, RPL_{D2}, RPL_{D3}$ are all known

In overview, alternative embodiments of the FIGS. 2, 3 sensor 26 comprise structural and functional changes which leave known radiation path lengths $$(RPL_{D1}, RPL_{D2}, RPL_{D3})$$

and their required inequalities (as generally expressed in equations (1)–(6)), invariant. Thus, it may be understood that there are a potentially infinite number of structural and functional changes which can be made to the sensor 26, while respecting the invariance constraints. For example, one can change indices of refraction ($n_1$, $n_2$, $n_3$) of one, two or three of the beamsplitters (28, 36) and spacer 46, while simultaneously adjusting their physical lengths or adding new spacers, all in accordance with equations (2)–(4). Or, one can leave the indices of refraction ($n_1$, $n_2$, $n_3$) as originally spedfled, but proportionately change the physical lengths (①,②,③,④, ⑤, ⑥, ⑦) of each of the beamsplitters, or add new spacers. Or, one can substitute diffraction gratings, in lieu of the beamsplitters (28, 36).

Figure 4A:
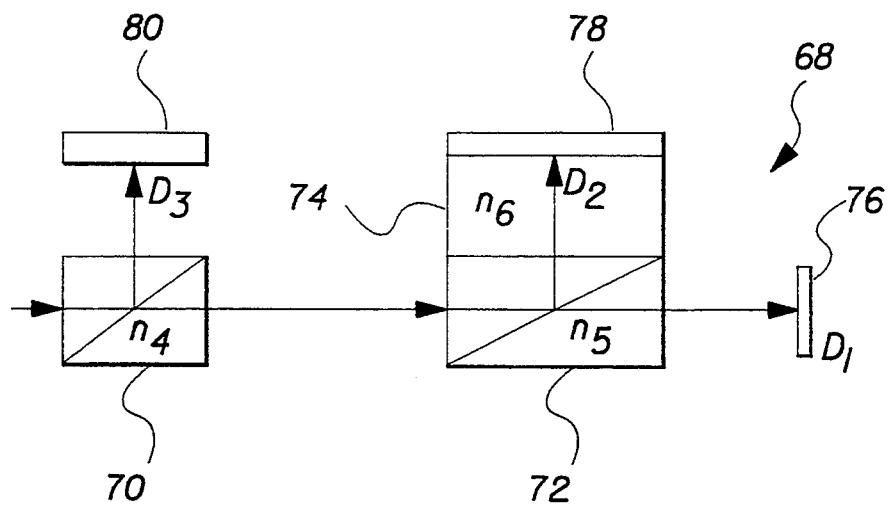
FIG. 4A, 4B show alternative embodiments of the sensor of the present invention.

Attention is now directed to FIGS. 4A, B, Which illustrate alternative embodiments of the FIG. 2 sensor 26.

FIG. 4A shows a sensor 68 comprising a pair of conventional beamsplitters 70, 72, a conventional plastic spacer 74, and three photographic films (76, 78, 80). Path lengths $D_1$, $D_2$, $D_3$ are also shown, and are required to satisfy the equations (1)–(6), supra.

The FIG. 4A sensor 68, compared to the FIG. 2 sensor 26, includes the following changes:

1) the beamsplitters 70, 72 are separated by a spacer (air);
2) the films (76, 78, 80) are all separated by spacers (either air, or the spacer 74) from the beamsplitters 70, 72;
3) the indices of refraction are now $n_4$, $n_5$, $n_6$, air; and
4) the radiation detectors (76, 78, 80) comprise photographic film.

The FIG. 4A embodiment emphasizes a versatility in design and utility in constructing the sensor of the present invention, and in readily adapting it to methods for determining focus error.

Figure 4B:
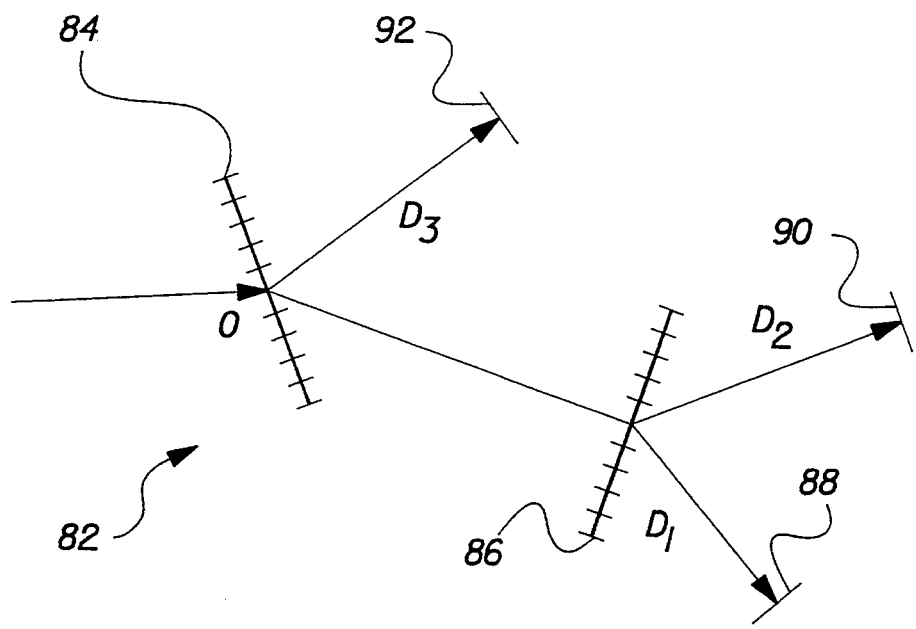

Attention is now directed to FIG. 4B, which shows a sensor of the present invention in a second alternative embodiment. A FIG. 4B sensor 82 comprises first and second diffraction gratings 84, 86 and three CCD arrays (88, 90, 92). Path lengths $D_1$, $D_2$, $D_3$ originating from a point 0 are also shown, and are required to satisfy the equations (1), (5), (6), supra. The sensor 82 is preferably used when it is desired to determine focus error, and the input radiation comprises the microwave spectrum.

We have now disclosed preferred and alternative embodiments of a sensor that is preferably employed in the method for determining focus error, as summarized above.

Figure 5:
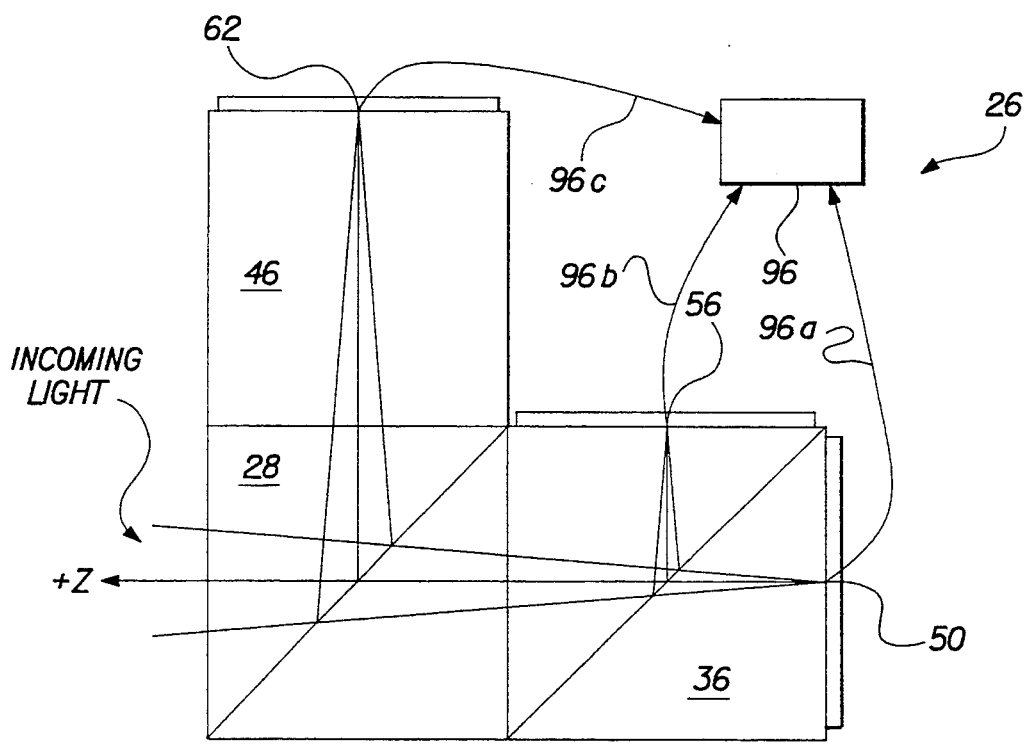
FIG. 5 shows an imaging system that can demonstrate a utility of a sensor of the present invention.
Figure 6:
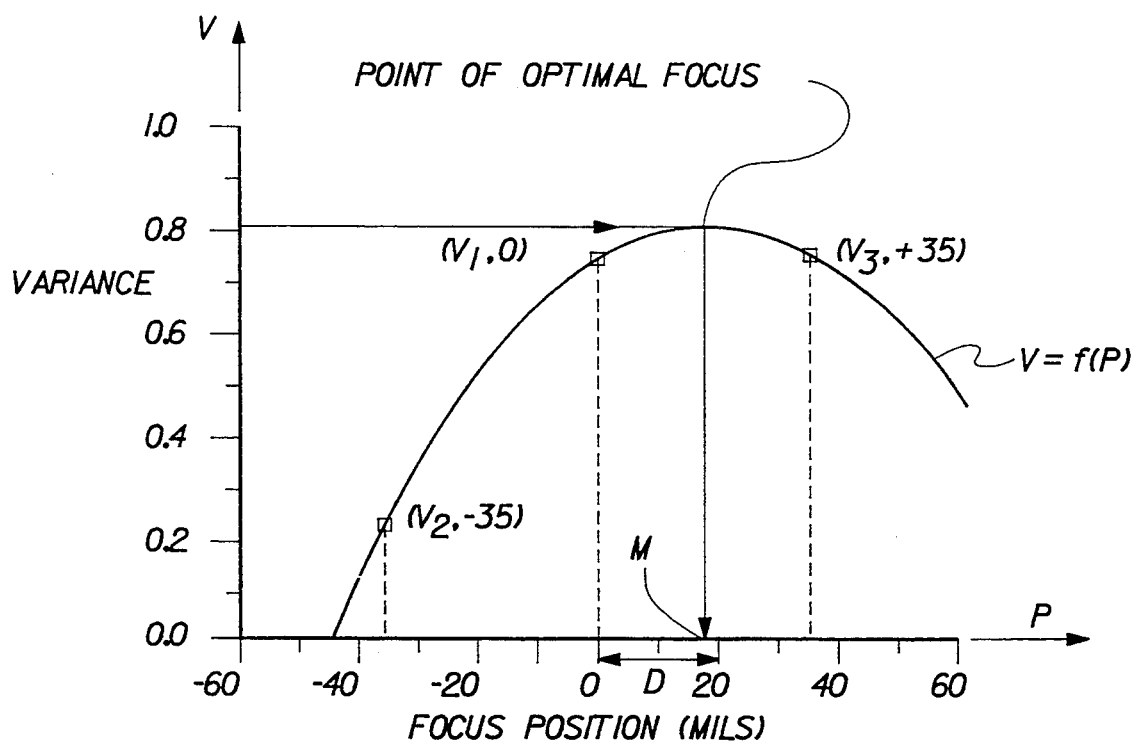
FIG. 6 shows a parabolic function generated by utilization of a sensor of the present invention.

An example of the method utilizing a parabolic curve is now disclosed, by way of FIG. 5 and FIG. 6. FIG. 5 shows the FIG. 2 sensor 26 located in an optical radiation field. The FIG. 2 sensor 26 has been adapted to provide inputs to a conventional image processing computer 94. The computer 94 receives inputs from the three CCD arrays (50, 56, 62) along lines 96a, b, c, respectively.

FIG. 5 also shows the sensor 26 orientation, in particular, the fact that the CCD array 50 is located at ideal focus, i.e., conjugate to a system prime focus, and that the CCD arrays 56, 62 are located a distance epsilon $\epsilon$ on either side of ideal focus. Here, by way of example only, $\epsilon = \pm 0.035$ inches.

In operation, the image processing computer 94 simultaneously acquires image information from the three CCD arrays (50, 56, 62). This image information corresponds to simultaneously sampling the input scene radiation at three different focus positions. (This condition is insured by the constraint $D_1 \neq D_2 \neq D_3 \neq D_1$ elaborated above.) The image information, moreover, corresponds to generating three independent focal signatures, i.e., focal signatures comprising radiation intensity (I) versus pixel position (P) in the CCD array, for each of the three CCD arrays (50, 56, 62).

FIG. 6 represents the method of U.S. Pat. No. 5,166,506 issued in the name of Fiete et al. In this related art method, the image processing computer 94 preferably computes a respective value ($V_1$, $V_2$, $V_3$) for the statistical variance (V) for each CCD array, and plots variance (V) as a function of CCD array position (P), expressed in mils. As shown in FIG. 6, an action of curve fitting the variance points (($V_1$, 0), $V_2$, $-35$), ($V_3$, $+35$)); and results in a parabolic function (V=F(f)) of variance as a function of image plane position along the optical axis. A parabolic function maximum (M) is a desired quantitative measure of the imaging system focus error, D. In more detail, the parabolic maximum is the location of optimal focus. The optical imaging system focus error is the difference between the optimal focus location and its displacement D from the imaging plane. However, the optimal performance from the sensor has not been achieved in FIG. 6

By contrast, in order to get the best performance from the sensor, the present invention discloses utilizing a reference curve that more accurately represents the range of sensor response to various focus positions than does the parabolic curve described in FIG. 6. This improved reference curve can be generated by: analytically determining the mathematical curve depending on the spatial frequency content of the particular scene that the sensor is viewing; or generating the shape of the reference curve by using the sensor to perform a calibration by purposely measuring a range of predetermined focus errors, thereby constructing the reference curve empirically and thus eliminating the generation from a specific mathematical function.

Figure 7:
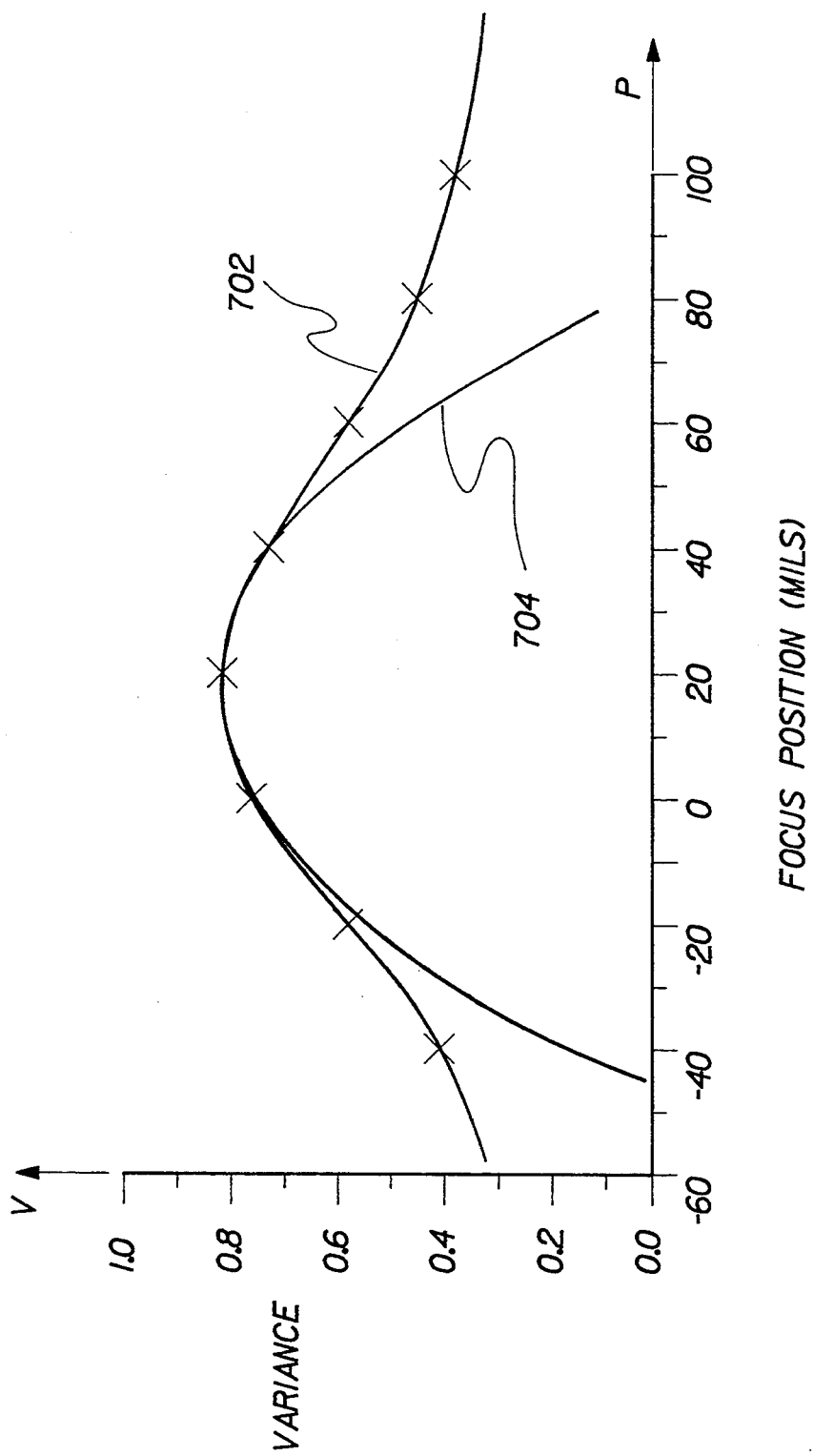
FIG. 7 shows a parabolic function as in FIG. 6, compared to a reference curve empirically-generated according to a preferred method of the present invention.

FIG. 7 illustrates the more robust accuracy obtained over using the parabolic curve of FIG. 6. FIG. 7. shows an empirically-generated reference focus curve 702 compared to a mathematically-determined parabolic curve 704. Because the reference curve 702 was empirically-generated by actual data received from the sensor, the reference curve 702 more accurately represents the sensor characteristics than does the parabolic curve 704, which was generated from a specific mathematical function.

Figure 8:
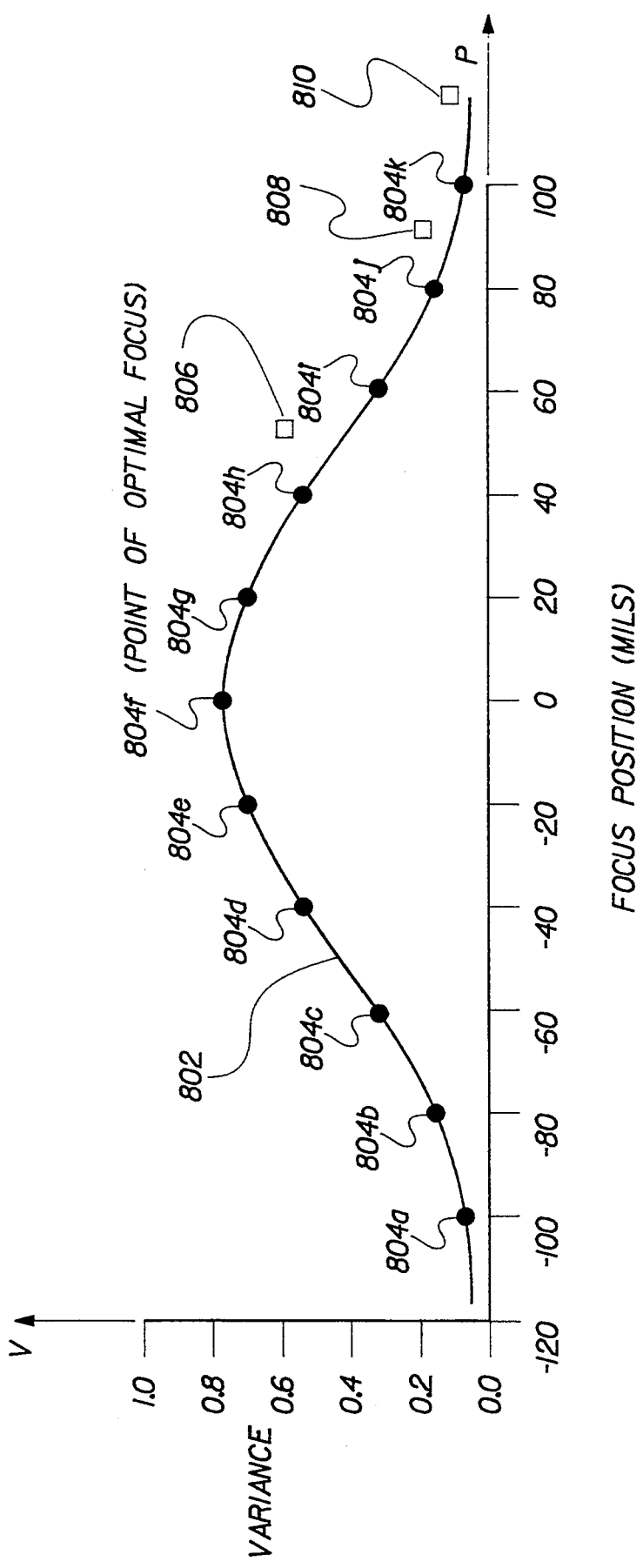
FIG. 8 shows a reference curve empirically-generated according to a preferred method of the present invention.

A preferred method of the present invention empirically generates a reference curve 802 shown in FIG. 8. The method generates the reference curve 802 by using the sensor to purposely measure the variance through a range of predetermined focus errors. The shape of the curve is generated by sampling greater than the three experimental points of FIG. 6. For instance, variance values 804a-k for each focus position from −100 mils to 100 mils in 20 mil increments may be calibrated and plotted to generate reference curve 802. This reference curve represents the present condition of the sensor. Because the present condition of the sensor may be dynamic, this curve can be updated by repeating the calibration of the sensor during use, thereby accounting for changes in: the condition of the sensor (dirty lens, drift of operating electronics); use conditions (temperature, environment); and scene changes, from satellite for example (winter (snow-covered) vs. summer (trees)).

Figure 9:
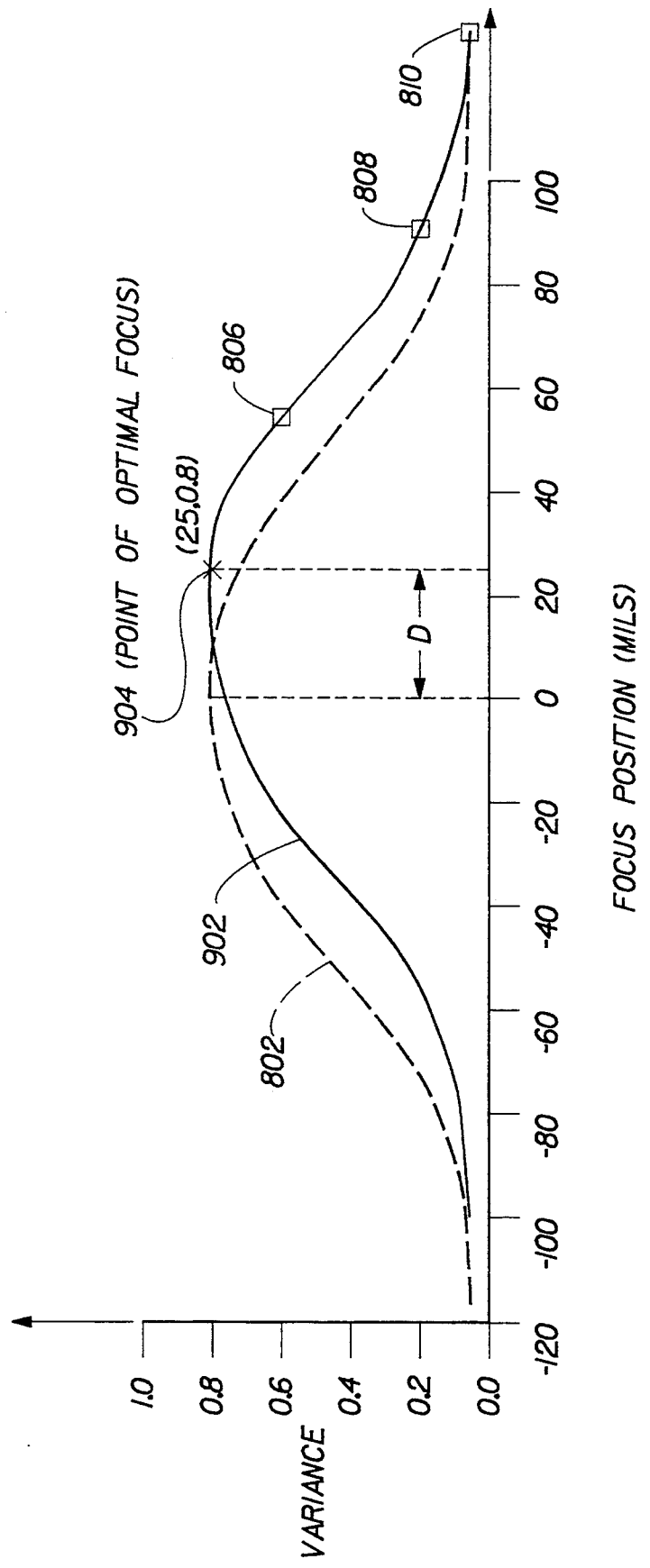
FIG. 9 shows a curve that has been laterally shifted from a position shown in FIG. 8, in order to establish a "best fit" and optimal focus error according to a preferred method of the present invention.

The sensor is then used to generate three actual focus point values 806, 808, 810. Note that the point of optional focus in FIG. 8 is the maximum of the curve 802 which is designated by variance value 804f located at 0 mils focus position. These actual points are fitted to curve 802 to establish a "best fit" for a particular focus sensor measurement. This "best fit" is determined by varying the vertical scale of the shape of curve 802, the horizontal scale of the shape of curve 802, and the lateral location (i.e. origin) of the shape of curve 802. As shown in FIG. 9, these scales and origin are varied to establish the best least-square fit of the three actual focus point values 806, 808, 810 (i.e. variances of actual intensity) to a scaled and shifted curve 902.

FIG. 9 shows the curve 902 shifted horizontally to fit the three actual focus point values 806, 808, 810. The point of optimal focus for curve 902 is the maximum of curve 902, designated in FIG. 9 as point 904 and located at a focus position of 25 mils. The optimal imaging focus error is equal to the lateral shift (D) of the curve shape 802 that resulted in the "best fit" of points 806, 808, 810. Therefore, the optimal imaging focus error in FIG. 9 is the shift (D=25 mils) from curve 802 to curve 902 which "best fits" actuals points 806, 808, 810.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

Parts List for FIGS. 1–9

10 = IMAGING SYSTEM
12 = CONVENTIONAL LENS
14 = RADIATION RAYS
16 = FIXED AND INFINITE OBJECT POINT
18 = FOCAL POINT
20 = FOCAL PLANE
22 = RADIATION DETECTOR
24 = IMAGING PLANE
26 = SENSOR
28 = FIRST BEAMSPLITTER
30 = INPUT SCENE RADIATION SURFACE
32 = FIRST OUTPUT SURFACE
34 = SECOND OUTPUT SURFACE
36 = SECOND BEAMSPLITTER
38 = TRANSMISSION RADIATION PATH
40 = INPUT RADIATION SURFACE
42 = FIRST OUTPUT SURFACE
44 = SECOND OUTPUT SURFACE
46 = SPACER
48 = REFLECTION PATH
50 = CCD ARRAY
52 = TRANSMISSION RADIATION PATH
54 = IMAGING PLANE
56 = CCD ARRAY
58 = RADIATION PATH
60 = IMAGING PLANE
62 = CCD ARRAY
64 = REFLECTION RADIATION PATH
66 = IMAGING PLANE
68 = SENSOR
70,72 = PAIR OF CONVENTIONAL BEAMSPLITTERS
76,78,80 = PHOTOGRAPHIC FILMS
82 = SENSOR
84 = FIRST DIFFRACTION GRATING
86 = SECOND DIFFRACTION GRATING
88,90,92 = CCD ARRAYS
94 = IMAGE PROCESSING COMPUTER
96a,b,c = COMPUTER INPUTS
702 = EMPIRICALLY-GENERATED REFERENCE CURVE
704 = PARABOLIC CURVE
802 = REFERENCE CURVE
804a-k = VARIANCE VALUES
806, 808, 810 = ACTUAL FOCUS POINT VALUES
902 = SCALED AND SHIFTED CURVE
904 = POINT OF OPTIMAL FOCUS

What is claimed is:

1. A method for quantitatively determining an imaging system focus error, the imaging system inputting a scene radiation field and re-imaging it at an ideal focal point, the method comprising the steps of:
   1) providing a sensor having a first, second, and third radiation detector;
   2) calibrating said sensor in order to generate a reference curve which accurately represents a functionality of said sensor;
   3) positioning the sensor in a portion of the input scene radiation field, and orienting the sensor so that the three radiation detectors each simultaneously image the same scene radiation field, for sampling it at the three different imaging surfaces;
   4) sampling the input scene radiation field at the first, second and third imaging surfaces, for recording, respectively, data corresponding to the radiation intensity of the sampled field at different points on each of the three imaging surfaces; and
   5) computing an optimal imaging surface location which serves as a measure of the imaging system focus error.

2. The method according to claim 1, wherein providing the sensor includes a sensor with elements comprising:
   a) a first beamsplitter comprising an input scene radiation surface, and a first and second output surface;
   b) a second beamsplitter located to be in a radiation path generated by the first output surface of the first beamsplitter, and comprising an input radiation surface, and a first and a second output surface;
   c) a first radiation detector located to be in a radiation path generated by the first output surface of the second beamsplitter, and defining a first imaging surface located at a known radiation path length $D_1$ as measured from the input surface of the first beamsplitter;

d) a second radiation detector located to be in a radiation path generated by the second output surface of the second beamsplitter, and defining a second imaging surface located at a known radiation path length $D_2$, as measured from the input surface of the first beamsplitter; and e) a third radiation detector located to be in a radiation path generated by the second output surface of the first beamsplitter, defining a third imaging surface located at a known radiation path length $D_3$, as measured from the input surface of the first beamsplitter;

the elements so constrained that: $D_1 \neq D_2 \neq D_3 \neq D_1$.

3. The method according to claim 2, wherein the computing step further comprises the steps of:

a) determining, from the recorded data, a value of a parameter representative of a statistical distribution of intensity vs. surface point position of the sampled field for each of the three imaging surfaces;

b) curve-fitting said reference curve to three points specified by the three imaging surface locations and the respective parameter values derived for the three imaging surfaces from step 5a; by varying the horizontal scale, vertical scale; and lateral location of said reference curve to establish an optimal least-squares fit of said three points; and c) computing a location of an optimal imaging surface, corresponding to a maximum value of the parameter for the reference curve, the computed optimal imaging surface location serving as a measure of the magnitude and direction of the imaging system focus error.

4. The method according to claim 3, wherein calibrating said sensor further comprises repeating said calibrating of said sensor a plurality of times during use of said sensor, in order to generate an updated reference curve which accurately represents a dynamic functionality of said sensor.

5. The method according to claim 3, wherein calibrating said sensor further comprises measuring the variance of said sensor over a range of predetermined focus errors.

6. The method according to claim 3, wherein calibrating said sensor further comprises analytically determining the variance of said sensor with a mathematical simulation over a range of simulated focus errors.

7. The method according to claim 3, wherein step 3 comprises positioning the sensor so that one of the radiation detectors is located conjugate to the imaging system prime focus.

8. The method according to claim 3, wherein the parameter determined in step 5 comprises a parameter representative of a variance magnitude.

9. The method according to claim 3, wherein step 5 comprises determining the imaging system focal error in real time with the sensor in a single fixed position.

10. A method for real time, automatic quantitative determination of distance and direction of displacement along an optical axis of the position of an in-focus image of an input scene radiation field focused by a radiation imaging system, from the position of a predetermined ideal focus point of the system, the method comprising the steps of:

dividing the input scene radiation field into first, second and third scene radiation field paths using beamsplitters;

simultaneously sampling the input scene radiation field along the first, second and third paths, using first, second and third radiation detectors defining first, second and third imaging planes respectively located at the ideal focus point, a distance epsilon $\epsilon$ short of the ideal focus point, and a distance epsilon $\epsilon$ beyond the ideal focus point;

computing a value of statistical variance based on intensity of the input scene radiation field sampled at different points in the imaging plane for each of the first, second and third imaging planes;

calibrating said sensor in order to generate a reference curve which accurately represents a functionality of said sensor; and from the generated reference curve, determining the distance and direction, from the first image plane location, of the image plane location that corresponds to the point of maximum variance of said reference curve; the determined distance and direction representing the distance and direction of displacement of the position of the in-focus image from the position of the ideal focus point.

11. The method according to claim 10, wherein calibrating said sensor further comprises repeating said calibrating of said sensor a plurality of times during use of said sensor, in order to generate an updated reference curve which accurately represents a dynamic functionality of said sensor.

12. The method according to claim 10, wherein calibrating said sensor further comprises measuring the variance of said sensor over a range of predetermined focus errors.

13. The method according to claim 10, wherein calibrating said sensor further comprises analytically determining the variance of said sensor with a mathematical simulation over a range of simulated focus errors.

14. The method as in claim 10, wherein the dividing step comprises dividing the field into the combined first and second paths and the third path using a first beamsplitter, and dividing the combined first and second paths into separate first and second paths using a second beamsplitter.

15. The method as in claim 14, wherein the field is divided so that the first path comprises transmission radiation path of the first beamsplitter, followed by a transmission radiation path of the second beamsplitter.

16. The method as in claim 15, wherein the field is divided so that the second path comprises a transmission radiation path of the first beamsplitter, followed by a reflection radiation path of the second beamsplitter and the third path comprises a reflection radiation path of the first beamsplitter.

17. The method as in claim 16, wherein the field is divided so that the third path further comprises the reflection radiation path of the first beamsplitter, followed by a path through a spacer.

18. The method as in claim 14, wherein the first beamsplitter has a reflection/transmission ration of 33%/67% and the second beamsplitter has a reflection/transmission ration of 50%/50%.

19. The method as in claim 10, wherein the first, second and third detectors comprise first, second and third CCD arrays.

20. The method as in claim 10, wherein the second detector defines a second imaging plane located at 0.035 inches short of the ideal focus point along the second path, and the third detector defines a third imaging plane located at 0.035 inches beyond the ideal focus point along the third path.

21. A method for real time, automatic quantitative determination of distance and direction of displacement along an optical axis of the position of an in-focus image of an input scene radiation field focused by a radiation point of the system, the method comprising the steps of:

dividing the input scene radiation field into first, second and thirds scene radiation field paths using beamsplitters;

simultaneously sampling the input scene radiation field along the first, second and third paths, using first, second and third radiation detectors defining first, second and third imaging planes respectively located at different first, second and third known distances from the reference point of the system;

computing a value of statistical variance based on the intensity of the input scene radiation field sampled at different points in the imaging plane for each of the first, second and third imaging planes;

calibrating said sensor in order to generate a reference curve which accurately represents a functionality of said sensor; and from said generated reference curve, determining the distance and direction, from the reference point location, of the image plane location that corresponds to the point of maximum deviation of said reference curve; the determined distance and direction representing the distance and direction of displacement of the position of the in-focus image from the position of the reference point.

22. The method according to claim 21, wherein calibrating said sensor further comprises measuring the variance of said sensor over a range of predetermined focus errors.

23. The method according to claim 21, wherein calibrating said sensor further comprises analytically determining the variance of said sensor with a mathematical simulation over a range of simulated focus errors.

24. The method according to claim 21, wherein calibrating said sensor further comprises repeating said calibrating of said sensor a plurality of times during use of said sensor, in order to generate an updated reference curve which accurately represents a dynamic functionality of said sensor.

* * * * *